(12) United States Patent
Knoerzer et al.

(10) Patent No.: US 6,833,170 B1
(45) Date of Patent: Dec. 21, 2004

(54) PUCKER RESISTANT FILM AND PACKAGE

(75) Inventors: Anthony Robert Knoerzer, Plano, TX (US); Garrett William Kohl, Allen, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 10/674,201

(22) Filed: Sep. 29, 2003

(51) Int. Cl.[7] .......................... B32B 27/32; B65D 65/40
(52) U.S. Cl. ................... 428/34.9; 428/35.7; 428/213; 428/516; 428/518; 428/520
(58) Field of Search ................. 428/34.9, 35.7, 428/213, 516, 518, 520, 346

(56) References Cited

U.S. PATENT DOCUMENTS 4,291,085 A * 9/1981 Ito et al. ..................... 428/215
6,106,934 A * 8/2000 Buongiorno et al. ........ 428/213

FOREIGN PATENT DOCUMENTS

JP          11292992 A  * 10/1999  .............. C08J/5/18

* cited by examiner

*Primary Examiner*—Sandra M. Nolan
(74) *Attorney, Agent, or Firm*—Colin P Cahoon; Carstens & Cahoon, LLP

(57) ABSTRACT

A flexible food package with a wall comprised of thin film layers, one of which has a reduced permeability characteristic that reduces absorption by the package wall of oils associated with the food product in the package. The reduced permeability characteristic is achieved by an enhanced orientation or enhanced crystallinity of the polymers forming the thin film layer. Reducing the amount of oil absorbed by the package wall reduces the amount of swelling, puckering, and disfigurement of the package.

9 Claims, 1 Drawing Sheet

PUCKER RESISTANT FILM AND PACKAGE

BACKGROUND OF THE INVENTION

1. Technical Field

The present invention relates to an improved flexible package with walls made up of multi-layer thin films. In particular, the package comprises a wall with a permeability characteristic that reduces absorption of substances associated with a packaged food product, and thereby prevents swelling and disfiguration of the package wall.

2. Description of Related Art

Packages made up of multi-layer flexible thin films are commonly used as food containers. The materials used to construct such films are generally chosen for their barrier properties, which act to prevent shelf life-reducing agents, such as oxygen, moisture, and light, from entering the bag. Different materials have different resistances to penetration of oxygen and moisture, so such variations are factors considered when the combination of films that make up a package is selected. It is also generally true that the cost of flexible films, and the containers they form, increases as the films' barrier characteristics improve. So, from a manufacturing perspective, it is desirable to maximize barrier characteristics, while minimizing cost.

As newer materials with improved barrier properties are developed, and package designs are improved to incorporate those developments, the shelf life of the food product in the improved package generally increases. One example of such an improvement is the use of ethyl vinyl alcohol (EVOH) as one of the layers making up a food container. Use of EVOH in food packages makes them more resistant to the penetration of oxygen, which in turn increases the shelf life of the product.

The various film layers incorporated into flexible food packages are often employed for purposes other than to prevent penetration of agents that directly affect product shelf life. For example, a layer may be incorporated to preserve another layer of the package wall. In this regard, ethyl vinyl alcohol (EVOH), an excellent barrier to oxygen, is often used as one of the layers making up a food package. However, its resistance to oxygen penetration is reduced if it is exposed to moisture. Additionally, moisture that could erode the oxygen resistance of EVOH is often present not only on the outside of a package, but, depending on the type of food product, may also be present on the product side of the package wall. Therefore, the package wall must often include barriers to moisture on both the outside and product side of an EVOH layer.

In addition to moisture, any oils and other substances associated with a food product also come in contact with the product side of a package wall. For example, FIG. 1 is a cross-sectional view of an embodiment of the wall of a typical multi-layer prior art food package. The first flexible thin film 220 is on the product side 210 of the package wall 200, and comprises a sealant film layer 222 and a core film layer 224. Preferably, the core film layer 224 is a polyolefin film, such as a polypropylene (PP) or polyethylene terephthalate (PET), or metalized PP or metalized PET. The sealant layer 222 typically comprises a ter-polymer blend of polypropylene, polyethylene, and polybutene. The ratio of these polymers on a weight basis is typically 5% polyethylene, 2% polybutene, and the remainder polypropylene. The sealant layer 222 is on the product side 210 of the first film 220. Thus, the sealant layer 222 comes into contact with the food product in the package, which may be chips, candies, or other snacks. Any other substances associated with the food product, such as preservatives, flavoring, moisture, or oils, also come into contact with the sealant layer 222 of the first film 220.

The second film 230 typically includes an EVOH layer between protective polymer layers. Alternatively, the second film 230 may include weakly bonded polymer layers that prevent tearing of the package upon opening by the consumer. The third film 240 includes a PP or PET film layer 244 that is on the outside 250 of the package, and often includes a printed ink layer 242, the characteristics of which depend on the application. When a printed ink layer 242 is included, the PP or PET film layer 244 is made transparent so that the ink layer 242 can be viewed.

One unforeseen consequence of improvements in barrier properties and the resultant extensions of product shelf life is excessive absorption by the package wall of substances associated with the packaged product, such as oils or moisture. Such substances come into direct contact with the inner surface of the package wall throughout the useful life of the package. Prior art packages made up of multi-layer thin films designed to possess barrier properties that prolong a product's shelf life did not anticipate absorption of oils from within the package that could become excessive and have destructive consequences. Over time, and especially at elevated temperatures, substances associated with a product that are in direct contact with the inner surface of a prior art package wall are absorbed by the thin films that make up the package wall. As a result, accumulation of the absorbed substances results in swelling of package walls, and blemishing of the package's appearance.

FIG. 2 illustrates a cross-sectional view of the disfigured appearance of a prior art package wall 300 due to absorption of substances, such as oils and/or moisture associated with a food product inside the package. As in FIG. 1, the first flexible thin film 10 comprises a sealant film layer 12 and core film layer 14, which may be any of PP, PET, metalized PP or metalized PET film. In applications requiring a prohibitive oxygen barrier, a second flexible thin film 30 typically includes an EVOH layer 34 sandwiched between moisture-blocking polymer layers 32, 36. A third flexible thin film 40, also a PP or PET film, is on the outside 50 of the package. Any liquid or semi-solid substances, such as oils and/or moisture, that are associated with a packaged product on the inside 20 of the package wall 300 may be absorbed by the wall 300. In the case of oils, the oils penetrate the sealant layer 12 and accumulate in the first thin film 10. Over time, and especially at elevated temperatures, the accumulation in the first thin film 10 causes it to swell. The swelling 15 is manifested in the appearance of the package as the surface 302, 304 of the package wall 300, on both the inside and outside of the package, develops a slightly uneven look, which may be described as dimpled or puckered. This undesirable disfiguration greatly reduces the shelf appearance, and aesthetic market value, of the package.

Therefore, an improved package design and method are needed that minimize the absorption of product oils in the walls of a package containing food. The improvement should provide optimum shelf appearance for a longer time period. At the same time, the cost associated with the improved package should be minimized and other package characteristics, such as product shelf-life enhancing properties, should be maintained.

SUMMARY OF THE INVENTION

The proposed invention comprises a flexible food package formed from multi-layer thin films, where a film layer having a permeability characteristic that reduces absorption of food product substances from within the package is incorporated into the package wall design. The permeability characteristic, also referred to herein as "reduced permeability" and "reduced permeability characteristic," is achieved by removing either the polyethylene or polybutene component from the ter-polymer sealant layer (making it a co-polymer layer) prior to orientation. The thus altered sealant layer decreases the amount of amorphousness of the polymer upon orientation, thereby reducing its permeability to food substances such as oil. An alternative embodiment of the invention reduces the amount of polyethylene and/or polybutene in the terpolymer of the sealant layer, leading as well to a decrease in amorphousness upon orientation and a reduction in permeability to oil. A reduction in permeability according to the present invention comprises reducing the amount of oil from a packaged food that is absorbed by the package wall, or slowing the rate at which oil from a packaged food is absorbed by the package wall. Maintaining either the polyethylene or polybutene in some amount in the sealant layer along with the polypropylene, however, maintains good sealing characteristics of the film.

Reducing absorption of food product oils by the package wall, or slowing the rate of absorption of such oils by the package wall, is increasingly necessary as better packaging technologies prolong the shelf life of food products. A longer shelf life lengthens the time the inner wall of the package is exposed to substances associated with the food product that the inner wall is likely to absorb from the food, such as oils and moisture. Through reducing absorption of product-side substances by the package wall over time, and especially at elevated temperatures, the invention prevents disfiguration of the package wall, such as swelling, and disfiguration of the package, such as puckering. The ability to better maintain the appearance of the package provides a significant advantage in a competitive food packaging environment.

BRIEF DESCRIPTION OF THE DRAWINGS

The novel features believed characteristic of the invention are set forth in the appended claims. The invention itself, however, as well as the preferred mode of use, and further objectives and advantages thereof, will be best understood when described in conjunction with the following illustrative embodiments wherein:

DETAILED DESCRIPTION

The present invention provides a film layer for use in forming food packages, where the film layer has a permeability characteristic that reduces absorption of oils associated with the packaged food. The permeability characteristic, also referred to herein as "reduced permeability" and "reduced permeability characteristic," is achieved by one or more of enhanced orientation or enhanced crystallinity of the film layer. A reduction in permeability according to the present invention comprises reducing the amount of oil from a packaged food that is absorbed by the package wall, or slowing the rate at which oil from a packaged food is absorbed by the package wall.

The reduced permeability characteristic is achieved by decreasing the amorphousness of the film layer by altering the composition of the traditional ter-polymer sealant layer prior to orientation. Amorphousness is well known in the art as a physical characteristic of common packaging polymers such as polypropylene (PP) and polyethylene terephthalate (PET). This characteristic is important in packaging because, generally, as polymer amorphousness increases, so does polymer permeability. Thus, to reduce the permeability of the polymer, it is desirable to decrease the amorphousness of the polymer(s) in the thin films.

Figure 1:
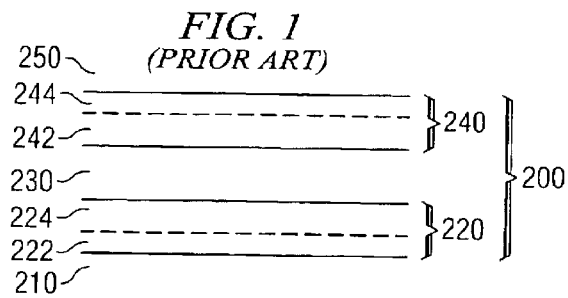
FIG. 1 is an illustration of a cross-section of the wall of a multi-layer thin film food package of the prior art.
Figure 2:
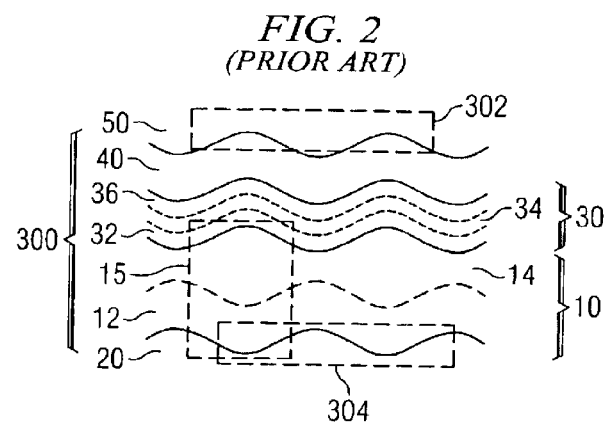
FIG. 2 is an illustration of a cross-section of the wall of a multi-layer thin film food package of the prior art wherein substances from the product side of the package wall have been absorbed by the package wall, resulting in puckering or disfiguration of the wall.
Figure 3:
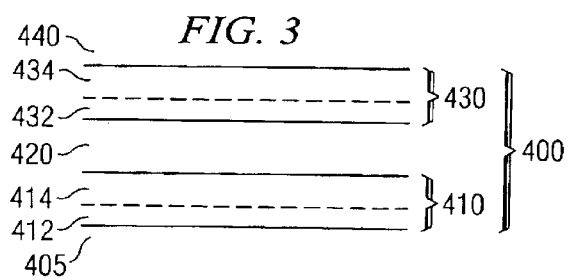
FIG. 3 is a cross-sectional view of an embodiment of a package wall according to the present invention wherein the package wall comprises a film layer with a reduced permeability characteristic.

Referring now to FIG. 3, a cross-sectional view of a package wall 400 in accordance with an embodiment of the present invention is illustrated. The wall 400 includes a first flexible thin film 410 on the product side 405 of the wall 400. The first flexible thin film 410 is comprised of a sealant layer 412 that comes into contact with food in the package and a first polymer layer 414.

The sealant layer 412 of the package wall 400 functions to seal the open ends of the package. Typically, this sealant function is accomplished because of the temperature at which the package is finally formed. The sealant layer is formed of a composition that melts at a lower temperature than the substances forming the other layers of the package wall. The melting of the sealant layer 412 seals the package, while the remaining layers of the package wall are not melted. It is readily apparent that melting of the remaining layers of the package wall is not desirable because such melting would cause the package to stick to the machinery used to form the package, and would result in the formation of disfigured packages.

The sealant layer is typically comprised of a ter-polymer blend, namely, by weight, about 93% polypropylene, about 5% polyethylene, and about 2% polybutene. Other polymers and polymer blends may be used, however, as long as such blends allow for the sealant function, one of ordinary skill in the art could readily use any of a number of polymers and polymer blends to form the sealant layer.

In particular, the sealant layer 412, possess a reduced permeability characteristic, which is achieved by enhancing the crystallinity of the sealant layer 412. To enhance the crystallinity of the sealant layer 412, one of either polyethylene or polybutene is removed from the traditional terpolymer blend known in the prior art prior to orientation. Thus, the sealant layer 412 is composed of a copolymer blend. Preferably, the co-polymer blend forming the sealant layer 412 comprises polypropylene and polybutene. This preferred embodiment allows for the polybutene to depress the melting point of the blend sufficiently to make the film's use as a sealant layer acceptable. Alternatively, polypropylene and polyethylene form the co-polymer blend.

By removing polyethylene or polybutene from the blend forming the sealant layer 412, the crystallinity of the sealant layer 412 is enhanced after orientation of the film over a sealant layer made of the ter-polymer blend as in the prior art. The crystallization is enhanced because the number of constituents forming the polymer blend is decreased. The fewer constituents make it easier for the blend to crystallize, with consideration to the required melting point of the blend. A sealant layer formed of polypropylene with polybutene or polypropylene with polyethylene retains its sealant function. It appears that the polybutene or the polyethylene, as long as one is used, sufficiently depresses the melting point of the sealant layer 412 to differentiate it from the melting point of the other layers of the package wall. Consequently, polypropylene and polybutene, used either alone or in combination, is referred to by Applicants as a "melting point depressing polymer component" when used with the polymer blends disclosed herein.

The permeability of the sealant layer 412 is reduced by enhancing the orientation of the sealant layer 412. By removing either polyethylene or polybutene from the blend forming the sealant layer 412, the orientation of the sealant layer 412 is enhanced over a sealant layer made of the ter-polymer blend as in the prior art. When stretched, the polypropylene lengths of the terpolymer blend have a tendency for the bonds therein to align in the same direction. That is to say, polypropylene is readily oriented when it is stretched. Polybutene and polyethylene also become oriented when stretched, but their tendency to do so is less than that of polypropylene. The lower tendencies of polyethylene and polybutene to orient decreases the overall orientation of the sealant layer 412. Thus, by removing polybutene or polyethylene from the ter-polymer blend, the orientation of the sealant layer 412 is enhanced. The enhanced orientation reduces permeability of the sealant layer 412.

In an alternative embodiment of the invention, the orientation of the sealant layer 412 is enhanced by reducing the amount of polybutene and/or polyethylene in the polymer blend forming the sealant layer 412. This embodiment requires reducing the polyethylene constituent of the polymer blend to less than 2.5% by weight. In addition to the reduction of the polyethylene, or as an alternative thereto, the polybutene is reduced to an amount of less than 1.0% by weight of the polymer blend. Because polyethylene and polybutene have a lower tendency to orient than does polypropylene, reducing their amounts in the sealant layer enhances the orientation of the sealant layer. The enhanced orientation reduces permeability of the sealant layer 412.

Still referring to FIG. 3, other layers of the package wall are illustrated. In particular, the first flexible thin film 410 further comprises a first polymer layer 414. The first polymer layer 414 preferably comprises oriented polypropylene (OPP), which has been oriented by the co-extrusion process discussed above. According to other embodiments, the first polymer layer 414 comprises PET, metalized PP or metalized PET, which was also formed by the co-extrusion process discussed above. Metalized polymer films are polymer films with a metal layer, such as aluminum, formed thereon. Methods for making metalized PP, metalized PET and other metalized polymer films are known.

The package wall further comprises a second flexible thin film 420. First flexible thin film 410 is laminated to second flexible thin film 420. Preferably, second flexible thin film 420 comprises one of oriented PP, PET, metalized PP and metalized PET.

Lamination is a process well known in the art for bonding or tying films to each other. Common lamination processes include adhesive and extrusion lamination, and substrates or films commonly laminated together include metals, polymers, and paper. With extrusion lamination, a heated polymer resin is used to bond or tie films into a laminated sheet. This laminated sheet may subsequently be bonded to another film or substrate, and so on, to achieve a desired composite of laminates. With adhesion lamination, an adhesive is applied to one substrate, and a second substrate is then laminated to the adhesive so the substrates are bonded together by the adhesive. In food packaging applications, lamination is the process by which selected thin films are bonded together in an arrangement necessary to achieve the desired environment and shelf life for the food product inside the package.

According to the embodiment illustrated in FIG. 3, a third thin film 430 is laminated to the second film 420 on the outside 440 of the package wall 400. The third film 430 is comprised of a first third film layer 432 and a second third film layer 434. The first third film layer 432 comprises a print layer, an ink layer, or a decorative layer. Preferably, the second third film layer 434 comprises PP or PET, and is preferably transparent to allow the first third film layer 432 underneath to be seen. According to another embodiment of package wall 400 of FIG. 3, third film layer 430 is not used. This embodiment is not illustrated, but one of ordinary skill in the art would readily appreciate that when third film layer 430 is not used, second film layer 420 is on the outside 440 of package wall 400.

According to other embodiments, other films are laminated to the third layer 430 on the outside 440 of the package wall 400. Thus, depending on the particular packaging application and desired barrier properties, any of a number of thin film configurations can employ the reduced permeability sealant layer of the present invention.

Figure 4:
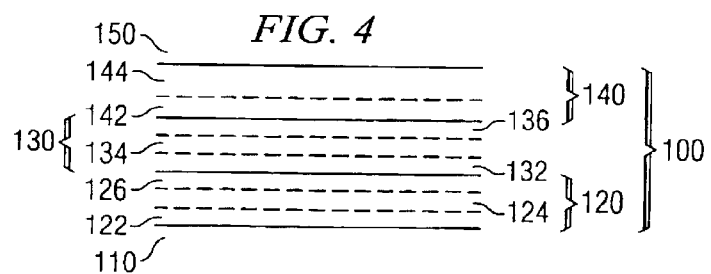
FIG. 4 is a cross-sectional view of another embodiment of a package wall according to the present invention wherein the package wall comprises a film layer with a reduced permeability characteristic.

For example, one such embodiment is illustrated in FIG. 4. According to the embodiment illustrated in FIG. 4, the package wall 100 is comprised of three multi-layer, laminated, flexible thin films. The first multi-layer film 120 is on the product side 110 of the package wall 100. The first film 120 is comprised of a sealant layer 122 that comes into contact with food in the package, and possesses a reduced permeability characteristic as described with reference to FIG. 3. Namely, the reduced permeability characteristic is achieved by either removing polyethylene or polybutene from the ter-polymer sealant layer 122 or by reducing the amount of one or both of such constituents, as previously described.

Referring still to FIG. 4, the first film 120 further comprises a first first film layer 124 and a second first film layer 126. First first film layer preferably comprises one of oriented polypropylene (PP) or polyethylene terephthalate (PET). Second first film layer preferably comprises one of oriented PP, PET, metalized PP or metalized PET.

A second multi-layer flexible thin film 130 is laminated to the first flexible thin film 120. Second thin film 130 comprises a first second film layer 132, a second second film layer 134, and a third second film layer 136. According to one embodiment, first second film layer 132 is polyethylene (PE), second second film layer 134 is polypropylene (PP) and third second film layer 136 is PE. The three layers are laminated so that the second second film layer 134 is sandwiched by lamination between the first and third layers 132 and 136. The bond between the second second film layer 134 and the first and third layers 132 and 136 is such that it promotes separation of the three layers when the user opens the package.

According to another embodiment, the second film layer 134 comprises ethyl vinyl alcohol (EVOH). According to this embodiment, the first and third second film layers 132 and 136 comprise PE, and the second second film layer 134 is sandwiched there between.

Still referring to FIG. 4, the package wall further comprises a third flexible thin film 140, which comprises a first third film layer 142 and a second third film layer 144. First third film layer 142 comprises any substrate suitable for holding print, color, or other decorative or advertising matter desired to be visible on the outside 150 of the package. Preferably, second third film layer 144 comprises PP or PET, which preferably is transparent so that the first third film layer 142 underneath is visible.

The reduced permeability of the sealant layer 122 reduces the absorption and accumulation of product oils in the first film 120 that would lead to swelling of the package wall 100. Even if oils from the product side 110 of the wall 100 are absorbed by the sealant layer 122, the rate of permeability is slower than that of sealant layers of the prior art. Thus, whether absorption of product oils is reduced or slowed, the reduced permeability of the sealant layer 122 prolongs the desired appearance of the package.

By incorporating a film layer with a decreased amorphousness into at least the first flexible thin film of a package wall, the present invention reduces the permeability of the package wall to oils and moisture associated with a packaged food product. The reduction in permeability reduces or slows absorption by the package wall of substances associated with the food product. The product oils whose absorption is reduced or slowed by the present invention could be any oils that accompany a food product and may be absorbed by the walls of the food package. Examples of such oils include but are not limited to corn, canola, sunflower, olive, or canola.

The flexible thin films assembled in the embodiments of FIGS. 3 and 4 may be arranged any number of ways depending on the particular packaging application. Furthermore, the flexible thin films of the present invention are of the type commonly employed in the art to produce flexible packages using a typical form, fill, and seal packaging machine, and are typically constructed of thin film layers of up to about 150 gauge thickness (1.5 mils or 0.0015 inches). The desired product environment to be maintained within a package drives the types and arrangements of thin films that are chosen for a particular packaging application. Other considerations include desired shelf life and cost. A plurality of package designs is possible, depending on the preceding factors. The materials making up the film layers, primarily plastics, are well known in the art. Examples of such materials are various vinyl, metalized, and polymer extrusion films, and various adhesives, ties, and bonding agents for fixing the thin film layers together. These materials vary in cost, as well as in their physical characteristics, such as flexibility, strength, and permeability to substances that decrease the shelf life of a food product, such as oxygen, moisture, and light.

One advantage of the present invention is the reduction in absorption of food product oils and moisture accomplished by the film layer with a decreased amorphousness. This advantage is most evident when employed in packaging applications involving a longer shelf life and exposure to elevated temperatures.

Another advantage of the present invention is its ability to prolong the optimal appearance of a food package through at least the shelf life of the product. By reducing absorption of product oils by the package wall, the present invention prevents swelling which would otherwise result in an uneven, dimpled, puckered appearance in the package surface. This aesthetic improvement provides a significant marketing advantage in a competitive environment. In addition, the invention accomplishes its purpose with minimal additional material and manufacturing costs.

As used herein, the term "package" should be understood to include any food container made up of multi-layer thin films. The sealant layers, thin films, and films with a decreased amorphousness as discussed herein are particularly suitable for forming packages for snack foods such as potato chips, corn chips, tortilla chips and the like. However, the sealant layers, films, and decreased amorphousness herein can be used to form packages for other foods. Moreover, while the layers and films discussed herein are contemplated for use in processes for the packaging of snack foods, such as the filling and sealing of bags of snack foods, the layers and films can also be put to use in processes for the packaging of other foods. While the invention has been particularly shown and described with reference to a preferred embodiment, it will be understood by those skilled in the art that various changes in form and detail may be made therein without departing from the spirit and scope of the invention.

What is claimed is:

1. A food package comprising:

a first thin film forming the product side of a wall of the food package, said first thin film comprising a sealant layer in contact with food in the food package, said sealant layer comprising polypropylene, no more than 2.5 percent by weight polyethylene, and no more than 1 percent by weight polybutene;

a second thin film to which said first thin film is laminated; and a third thin film laminated to said second thin film.

2. The food package of claim 1 wherein said scalant layer consists essentially of polypropylene and polyethylene.

3. The food package of claim 1 wherein said sealant layer consists essentially of polypropylene and polyethylene.

4. The food package of claim 1 wherein said third thin film forms an outside wall of the food package.

5. A food package comprising:

a first thin film forming the product side of a wall of the food package, said first third film comprising a sealant layer in contact with food in the food package, said sealant layer comprising at least 93% polypropylene and one other polymer constituent, wherein said other polymer constituent is polyethylene or polybutene;

a second thin film to which said first thin film is laminated; and a third fink film laminated to said second thin film.

6. The food package of claim 5 wherein said sealant layer comprises no more than 2.5 percent by weight polyethylene.

7. The food package of claim 5 wherein said sealant layer comprises no mow than 1 percent by weight polybutene.

8. The food package of claim 5 wherein said third film forms on outside wall of the food package.

9. A food package comprising:

a sealant layer in contact with food inside said package, said sealant layer consisting essentially of polypropylene and a melting point depressing polymer component, wherein said melting point depressing polymer component is one of (i) polybutene, (ii) polyethylene, (iii) about 5 percent by layer weight polyethylene and less than 1 percent by layer weight polybutene, or (iv) about 2 percent by layer weight polybutene and less than 2.5 percent by layer weight polyethylene.

* * * * *

UNITED STATES PATENT AND TRADEMARK OFFICE
CERTIFICATE OF CORRECTION

PATENT NO. : 6,833,170 B1
DATED : December 21, 2004
INVENTOR(S) : Knoerzer et al.

It is certified that error appears in the above-identified patent and that said Letters Patent is hereby corrected as shown below:

Column 8,
Line 35, delete "polyethylene" and insert -- polybutene --
Line 40, delete "third" and insert -- thin --
Line 47, delete "fink" and insert -- thin --
Line 51, delete "mow" and insert -- more --
Line 54, delete "on" and insert -- an --

Signed and Sealed this

Twelfth Day of April, 2005

JON W. DUDAS
*Director of the United States Patent and Trademark Office*